United States Patent [19]

Haaf

[11] 4,322,507

[45] * Mar. 30, 1982

[54] MOLDED ARTICLE OF POLYPHENYLENE ETHER AND HYDROGENATED BLOCK COPOLYMER

[75] Inventor: William R. Haaf, Voorheesville, N.Y.

[73] Assignee: General Electric Company, Pittsfield, Mass.

[*] Notice: The portion of the term of this patent subsequent to Sep. 11, 1996, has been disclaimed.

[21] Appl. No.: 129,986

[22] Filed: Mar. 13, 1980

[51] Int. Cl.³ .............................................. C08L 51/00
[52] U.S. Cl. ...................................................... 525/92
[58] Field of Search .......................................... 525/92

[56] References Cited

U.S. PATENT DOCUMENTS 4,167,507  9/1979  Haaf ...................................... 525/92

Primary Examiner—Garman J. Seccuro
Attorney, Agent, or Firm—Hedman, Casella, Gibson and Costigan

[57] ABSTRACT

Improved polyphenylene ether-containing molded articles are described. These contain high molecular weight hydrogenated block copolymers of a vinyl aromatic compound and a diene. The articles exhibit excellent mechanical properties but do not exhibit the lamination as observed in similar articles containing lower molecular weight block copolymers.

11 Claims, No Drawings

MOLDED ARTICLE OF POLYPHENYLENE ETHER AND HYDROGENATED BLOCK COPOLYMER

The present invention relates to molded articles substantially free of lamination comprising a polyphenylene ether, alone, or combined with a styrene resin, and a selectively-hydrogenated A-B-A type block copolymer of alkenyl aromatic (A) and diene (B) compounds, in which the A blocks have a molecular weight of at least 15,000.

BACKGROUND OF THE INVENTION

In Haaf, U.S. Pat. No. 4,167,507, the effectiveness of hydrogenated A-B-A block copolymers of vinyl aromatics (A) and dienes (B) as impact improvers for polyphenylene-ether-based compositions has been clearly demonstrated. In the patent, reference was made to certain commercial grades of hydrogenated A-B-A block copolymers, identified as Shell's Kraton GXT-0650 (now known also as G-1650), GXT-0772 and GXT-0782. These copolymers are also described in Jones, U.S. Pat. No. 3,431,323. Both patents are incorporated herein by reference.

The compositions of hydrogenated A-B-A block copolymers with polyphenylene ethers may be melt processed, e.g., by injection molding, extrusion and the like, to produce plastic articles having good physical properties. Especially noteworthy are superior resistance to impact and thermal aging, as well as excellent gloss and moldability characteristics.

The blends, with the commercial copolymers described in the '507 patent, however, tend characteristically to exhibit delamination. "Delamination" in this sense refers to the existence of poorly-adherent strata within the body of a plastic article. These layers, oriented into planes parallel to the direction of melt processing, are roughly analogous in appearance to a deck of cards viewed in cross-section. The presence of lamination can be made readily visible by cutting into a specimen molded from the composition of polyphenylene ether and A-B-A block copolymer, then twisting it. Unfortunately, under certain melt-processing conditions, this internal lamination can also become visually obvious on the surfaces of unbroken parts, becoming a defect which renders such parts undesirable on aesthetic grounds.

It has now been discovered that the aforementioned desirable properties can be obtained but without undesirable lamination, if a particular type of hydrogenated A-B-A block copolymer is used in place of the embodiments disclosed in the '507 patent. The new discovery requires the use of a high molecular weight polymer, higher than the 74,000 maximum total molecular weight in the previous embodiments, and more specifically the molecular weight of the vinyl aromatic blocks, e.g., polystyrene, should be higher than previously described in the actual embodiments of the '507 patent. Each of these vinyl aromatic blocks should be at least 15,000 and preferably from 20,000 to 40,000 in molecular weight. The diene blocks, before saturation should be greater than 50,000, making the minimum total molecular weight of the A-B-A block copolymer at least 80,000, substantially above the 74,000 maximum for the prior art embodiments.

DESCRIPTION OF THE INVENTION

According to the present invention there are provided three dimensional articles substantially free of lamination comprised of a thermoplastic composition comprising (a) from 10 to 99 parts by weight of a polyphenylene ether resin or a polyphenylene ether resin in combination with a styrene homopolymer or random copolymer resin; and (b) from 1 to 90 parts by weight of a hydrogenated block copolymer of the A-B-A type where A is a polymerized monoalkenyl aromatic hydrocarbon block having an average molecular weight of greater than about 15,000 and B is a polymeric diene block having an average molecular weight of about 50,000–450,000, block B having had its unsaturated reduced to less than 10% of the original unsaturation.

In preferred features, in component (b) prior to hydrogenation:

(i) the blocks A constitute from 2–35 weight percent of the copolymer; and (ii) 35–55 percent of the conjugated diene carbon atoms in block B are in vinyl side chains.

Preferred compositions will be those in which the polyphenylene ether comprises at least 20% by weight of the total resinous components in the composition.

It is to be understood, however, that the present composition can also include conventional amounts of conventional additives for processability, flame retardancy, stability and the like. These components are described in the literature and are described in the Modern Plastics Encyclopedia, Vol. 49 No. 10A 1972-1973 pp. 352-435, which are hereby incorporated by reference.

Contemplated also are reinforced compositions containing reinforcing amounts of reinforcements, such as powders, whiskers, fibers or platelets of metals, e.g., aluminum, bronze, iron or nickel, and non-metals, e.g., carbon filaments, acircular $CaSiO_3$, asbestos, $TiO_2$, titanate whiskers, glass flakes and fibers and the like. Such reinforcements will be present in an amount of e.g., 2 to 90% by weight, preferably 10 to 60% by weight. Especially preferred as a reinforcement is fibrous glass.

In preferred compositions the polyphenylene ether resins in component (a) will be those having repeating structural units of the formula

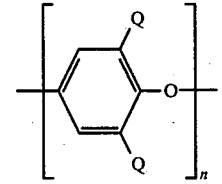

wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon, radicals, halohydrocarbon radicals having at least two carbon atoms between the halogen atom and the phenyl nucleus, hydrocarbonoxy radicals, and halohydrocarbonoxy radicals having at least two carbon atoms between the halogen atom and phenyl nucleus. The preparation of polyphenylene ether resins corresponding to the above formula is described in patents of Hay, U.S. Pat. No.

3,306,874 and 3,306,875. Especially preferred polyphenylene ether resins for purposes of the present invention are those having alkyl substitution in the two positions ortho to the oxygen ether atom—i.e., where each Q is alkyl, most preferably, having from 1 to 4 carbon atoms. The most preferred polyphenylene ether resin for purposes of the present invention is poly(2.6-dimethyl-1,4-phenylene)ether (each Q is methyl).

With respect to component (b), the hydrogenated block copolymers of the A-B-A type are made by means known in the art and they are commercially available.

Prior to hydrogenation, the end blocks of these copolymers comprise homopolymers or copolymers prefereably prepared from alkenyl aromatic hydrocarbons and particularly vinyl aromatic hydrocarbons wherein the aromatic moiety may be either monocyclic or polycyclic. Typical monomers include styrene, alpha methyl styrene, vinyl xylene, ethyl vinyl xylene, vinyl naphthalene and the like or mixtures thereof. The end blocks may be the same or different. The center block may be derived from, for example, polyisoprene or polybutadiene.

The ratio of the copolymers and the average molecular weights can vary broadly although the molecular weight of center block should be greater than that of the combined terminal blocks. It is essential to form terminal blocks A having average molecular weights of 15,000–115,000 and center block B e.g., a polybutadiene block with an average molecular weight of 50,000–450,000. Still more preferably, the terminal blocks have average molecular weights of 20,000–40,000 while the polybutadiene polymer blocks has an average molecular weight between 50,000 and 300,000. The terminal blocks will preferably comprise 2–33% by weight or more preferably, 5–30% by weight of the total block polymer. The preferred copolymers will be those formed from a copolymer having a polybutadiene center block wherein 35–55%, or more preferably, 40–50% of the butadiene carbon atoms are vinyl side chains.

The hydrogenated copolymers will have the average unsaturation reduced to less than 20% of the original value. It is preferred to have the unsaturation of the center block B reduced to 10%, or more preferably, 5% of its original value.

The block copolymers are formed by techniques well known to those skilled in the art. Hydrogenation may be conducted utilizing a variety of hydrogenation catalysts such as nickel on kieselguhr, Raney nickel, copper chromate, molybdenum sulfide and finely divided platinum or other noble metals on a low surface area carrier.

Hydrogenation may be conducted at any desired temperature or pressure, from atmospheric to 300 p.s.i.g. the usual range being between 100 and 1000 p.s.i.g. at temperatures from 75° F. to 600° F. for times between 0.1 and 24 hours, preferably from 0.2–8 hours.

Hydrogenated block copolymers of the type sold under the tradename Kraton G-1651 from Shell Chemical Co., Polymers Division, have been found suitable for use in the present invention.

As noted above, the hydrogenated block copolymer resin may be added to a polyphenylene ether resin or to a composition of a polyphenylene ether resin with an additional resin, preferably a polystyrene, homopolymer or random copolymer resin and most preferably a high-impact polystyrene resin. As disclosed in the above-mentioned Cizek patent, the styrene resin most readily combinable with the polyphenylene ether resin is one having at least 25% by weight polymer units derived from vinyl aromatic monomer having the formula

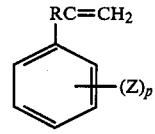

wherein R is hydrogen alkyl of 1 to 4 carbon atoms or halogen; Z is a member selected from the class consisting of vinyl, hydrogen, or alkyl of from 1 to 4 carbon atoms; and p is from 1 to 5. Such compositions will comprise from 1 to 99% by weight of the polyphenylene ether component and from 99 to 1% by weight of the polystyrene resin. The preferred styrene resin, for purposes of this invention, is one comprising either a styrene homopolymer or a rubber-modified polystyrene, e.g., blended or grafted with from about 3 to 30, preferably from 4 to 12% by weight of a polybutadiene or a rubbery random copolymer, e.g., of about 70% BD and 30% styrene.

The amount of hydrogenated block copolymer resin added to the polyphenylene ether resin or composition thereof with polystyrene may vary within rather broad limits, but preferably ranges from about 10 to 90% by weight of the total components of the composition.

In a preferred family of compositions, the polyphenylene ether comprises from about 10 to about 90% by weight, the hydrogenated block copolymer from about 10 to about 90% by weight and the styrene homopolymer or random copolymer resin component comprises from 0 to the remainder by weight of the total weight of the resinous components in said composition. Especially preferred are compositions in which the polyphenylene ether is poly(2,6-dimethyl-1,4-phenylene)ether and comprises from about 10 to about 60% by weight, component (b) is a hydrogenated block copolymer of the A-B-A type and comprises from about 5 to about 50% by weight and the styrene homopolymer or random copolymer resin component is a rubber-modified polystyrene and comprises from 0 up to the remainder by weight of the total weight of the resinous components in the composition.

As noted hereinabove, other additives may be present in the compositions such as plasticizers, pigments, flame retardants and stabilizers in amounts varying between about 1 and 30 percent by weight of the total composition. The above-stated range from the hydrogenated block copolymer resin, the polyphenylene ether resin and, if present, the polystyrene resin, is based solely upon such resinous components in the polymer blend and excludes other additives.

The method of forming the polymer composition is not critical, prior art blending techniques being suitable. The preferred method comprises blending the polymers and additives, such as reinforcements in powder, granular and filamentous from—as the case may be—extruding the blend and chopping into pellets suitable for molding to shape by means conventionally used to mold normally solid thermoplastic compositions.

DESCRIPTION OF THE PREFERRED EMBODIMENTS

The following examples illustrate the present invention. They are not to be construed as limiting the claims in any manner whatsoever.

EXAMPLES 1-3

A number of molded articles are prepared by melt blending in a Werner-Pfleiderer twin screw extruder at 575° F. poly(2,6-dimethyl-1,4-phenylene)ether, a high impact rubber-modified polystyrene and a hydrogenated A-B-A type styrene-ethylene butylene-styrene copolymer having polystyrene end blocks A in a molecular weight range above 15,000. For comparison purposes, prepared and molded are compositions in which the A-B-A component comprises polystyrene end blocks with less than 15,000 molecular weight. The compositions include small amounts of stabilizers and pigments. Moldings are made in a 4 oz. Newbury injection molding machine at 500° F. (cylinder) and 190° F. (mold). The formulations used and the results obtained are set forth in Table 1:

TABLE 1
Molded Articles Comprising Polyphenylene Ether, Polystyrene, and Hydrogenated A-B-A Block Copolymers

| Example | 1A* | 1 | 1B* | 1C* | 2A* | 2 | 3A* | 3 |
|---|---|---|---|---|---|---|---|---|
| Composition (parts by weight) | | | | | | | | |
| Poly(2,6-dimethyl-1,4-phenylene)ether[a] | 30 | 30 | 30 | 30 | 30 | 30 | 30 | 30 |
| Rubber-modified polystyrene[b] | 60 | 60 | 45 | 45 | 40 | 40 | 30 | 30 |
| Hydrogenated A-B-A block copolymer styrene-butadiene-styrene[c] | 10 | — | 25 | — | 30 | — | 40 | — |
| Hydrogenated A-B-A block copolymer styrene-butadiene-styrene[d] | — | 10 | — | — | — | 30 | — | 40 |
| Hydrogenated A-B-A block copolymer styrene-butadiene-styrene[e] | — | — | — | 25 | — | — | — | — |
| Properties | | | | | | | | |
| Izod impact, ft. lbs./in. notch[f] | 5.9 | 7.0 | 8.3 | 9.4 | 8.6 | 13.1 | 7.1 | 13.2 |
| Gardner impact[g], in. lbs. 73° F. | 235 | 245 | 165 | 170 | 155 | 220 | 160 | 200 |
| −40° F. | 116 | 105 | >240 | >240 | >240 | >240 | >240 | >240 |
| % Elongation[h] | 67 | 71 | 67 | 47 | 57 | 58 | 74 | 32 |
| Modulus[i] psi × 10³ | 249 | 280 | 135 | 176 | 72 | 221 | 66 | 193 |
| Degree of Lamination | Low | None | High | Low-Moderate | High | None | Very High | None |

*Control
[a]General Electric Company, PPO in powder form, intrinsic visc. 0.40-0.45 dl./g.
[b]Foster Grant (FG834), small rubber particle HIPS
[c]Total MW 53,000; PSMW 7,500
[d]Total MW 174,000; PSMW 29,000
[e]Total MW 74,000; PSMW 10,000
[f]⅛" × ½" × 2½" specimen
[g]⅛" × 2½" × 3½" specimen
[h]Tensile elongation 2½ L-type specimen
[i]Flexural modulus, ⅛" × ½" × 2½" specimen It can be seen that the block copolymer of high molecular weight end blocks effectively impact-modifies polyphenylene ether compositions without introducing lamination. In addition, articles containing this copolymer demonstrate superior impact reinforcement and superior mechanical strength.

EXAMPLE 4

Molded articles according to this invention are prepared by melt blending in a 28 mm. WP twin screw extruder at 570° F. poly(2,6-dimethyl 1,4-phenylene)ether, rubber-modified polystyrene and a selectively hydrogenated linear block copolymer of styrene and butadiene, in which the styrene blocks have a molecular weight greater than 15,000. Molding is done at 550° F. set/240° F. mold set in a 4 oz. Newbury machine. For comparison purposes, molded articles are made with a composition into which is substituted a linear block copolymer having polystyrene end blocks of less than 15,000. Small amounts of stabilizers and processing aids are present in both. The compositions and the properties are set forth in Table 2:

TABLE 2
Molded Articles Comprising Polyphenylene Ether, Polystyrene and Hydrogenated A-B-A Block Copolymers

| Example | 4 | 4A* |
|---|---|---|
| Composition (parts by weight) | | |
| Poly(2,6-dimethyl-1,4-phenylene)ether[a] | 33 | 33 |
| Rubber-modified polystyrene[b] | 55 | 55 |
| Hydrogenated A-B-A block copolymer styrene-butadiene-styrene[c] | 12 | — |
| Hydrogenated block copolymer styrene-butadiene-styrene[d] | — | 12 |
| Properties | | |
| Heat distortion temp., °F. at 266 psi | 232 | 232 |
| Izod impact strength, ft. lbs./in. notch, 73° F. | 6.4 | 5.2 |
| −20° F. | 3.8 | 2.5 |
| Gardner impact strength, in.-lbs., 73° F. | 201 | 188 |
| −20° F. | 108 | 135 |
| Flexural yield strength, psi × 10³ | 10 | 9.3 |
| Flexural modulus, psi × 10³ | 311 | 317 |
| Lamination, Gate Skin[e] | 2 | 5 |
| Gate Core | 0 | 2 |
| Dead Skin | 0 | 5 |
| Dead Core | 0 | 3 |
| ΣSummation | 2 | 15 |

*Control
[a]General Electric Co., see footnote Table 1
[b]General Electric Co., A6H6HIPS
[c]See Table 1 footnote c
[d]See Table 1 footnote d
[e]Injection molded plaque, ⅛" × 2½" × 3½", range 0 best to 7 worst case.

EXAMPLE 5

A molded article is prepared by melt blending in a ¾" Brabender single screw (1:1) laboratory extruder at 530° F. set and 130 rpm poly(2,6-dimethyl-1,4-phenylene)ether, a hydrogenated A-B-A-type styrene-ethylenebutylene-styrene copolymer having polystyrene end blocks A in a molecular weight range of 29,000 and a phosphate plasticizer/flame retardant. The composition includes a small amount of stabilizer and a pigment. Injection-moldings are made in a 4 oz. Newbury machine at 575° F. set/230° F. mold set. The formulation used and the properties obtained are set forth in Table 3:

TABLE 3

Molded Articles Comprising Polyphenylene Ether, Hydrogenated A-B-A Block Copolymer and Phosphate Flexibilizer/Flame Retardant

| Example | 5 |
|---|---|
| Composition (parts by weight) | |
| Poly(2,6-dimethyl-1,4-phenylene)ether[a] | 92 |
| Hydrogenated A-B-A block copolymer styrene-butadiene-styrene[b] | 8 |
| Tri(isopropylphenyl)phosphate[c] | 8 |
| Properties | |
| Heat distortion temperature, °F. at 266 psi | 292 |
| Izod impact strength, ft.-lbs./in. notch | 7.4 |
| Gardner impact strength, in.-lbs. | 260 |
| 45° Gloss value | 62.1 |
| Flammability, averaged UL94[d] | |
| ⅛", flame-out, sec., rating | 2.1, V-O |
| 1/16", flame-out, sec., rating | 3.4, V-O |
| Lamination, Gate Skin[e] | 0 |
| Gate Core | 0 |
| Dead Skin | 1 |
| Dead Core | 0 |
| ΣSummation | 1 |

[a]General Electric Co., see footnote Table 1
[b]See footnote d Table 1
[c]FMC, Kronitex 50
[d]Underwriters Laboratories Flame Test
[e]See Footnote Table 2.

The freedom from lamination is outstanding. Lamination is observed on the other hand is a hydrogenated A-B-A type block copolymer having styrene end blocks of less than 15,000 molecular weight is substituted.

Obviously, other modifications and variations of the present invention are possible in the light of the above teachings. It is, therefore, to be understood that changes may be made in the particular embodiments of the invention described which are within the full intended scope of the invention defined in the appended claims.

I claim:

1. A three dimensional article substantially free of lamination comprised of a thermoplastic composition comprising
   (a) from 10 to 99 parts by weight of a polyphenylene ether resin or a polyphenylene ether resin in combination with a styrene homopolymer or random copolymer resin; and
   (b) from 1 to 90 parts by weight of a hydrogenated block copolymer of the A-B-A type where A is a polymerized monoalkenyl aromatic hydrocarbon block having an average molecular weight of greater than about 15,000 and B is a polymeric diene block having an average molecular weight of about 50,000-450,000, block B having had its unsaturation reduced to less than 10% of the original unsaturation.

2. An article as defined in claim 1 wherein, in component (b) prior to hydrogenation:
   (i) the blocks A constitute from 2-35 weight percent of the copolymer; and
   (ii) 35-55 percent of the conjugated diene carbon atoms in block B are in vinyl side chains.

3. An article as defined in claim 1 wherein each block A has an average molecular weight in the range of 20,000 to 40,000.

4. An article as defined in claim 1 wherein component (a) is a polyphenylene ether of the formula

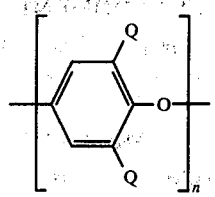

wherein the oxygen ether atom of one unit is connected to the benzene nucleus of the next adjoining unit: n is an integer of at least 50; and each Q is a monovalent substituent selected from hydrogen, halogen, hydrocarbon radicals, halohydrocarbon radicals having at least two carbon atoms between the halogen atom and the phenyl nucleus, hydrocarbonoxy radicals, and halohydrocarbonoxy radicals having at least two carbon atoms between the halogen atom and the phenyl nucleus.

5. An article as defined in claim 4 wherein each Q is alkyl having from 1 to 4 carbon atoms.

6. An article as defined in claim 5 wherein each Q is methyl.

7. An article as defined in claim 1 wherein in component (b) the monoalkenyl aromatic hydrocarbon is styrene.

8. An article as defined in claim 1 wherein said diene is butadiene.

9. An article as defined in claim 1 wherein component (a) comprises:
   (i) from 1 to 99% by weight of a polyphenylene ether of the formula

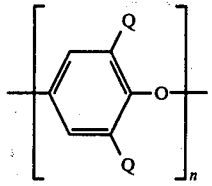

wherein Q is alkyl of from 1 to 4 carbon atoms and n is an integer of at least 50 and
   (ii) from 99 to 1% by weight of a styrene homopolymer or random copolymer resin having at least 25% of the polymer units derived from a vinyl aromatic compound of the formula

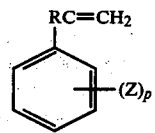

wherein R is hydrogen, alkyl of from 1 to 4 carbon atoms or halogen, Z is hydrogen, alkyl of from 1 to 4 carbon atoms or vinyl and p is an integer of from 1 to 5.

10. An article as defined in claim 9 wherein the styrene resin is a styrene homopolymer resin or a rubber-modified styrene resin, said rubber comprising a diene rubber or a rubbery copolymer of butadiene and styrene in an amount of from about 4 to about 12% by weight of said resin.

11. An article as defined in claim 9 wherein the polyphenylene ether is poly(2,6-dimethyl-1,4-phenylene)ether.

* * * * *